Aug. 5, 1924.

R. B. SMART

ADDRESSING MACHINE

Filed May 6, 1921

Witness
Edward T. Wray.

Inventor
Rupert B. Smart
by Parks & Carts
Attorneys

Aug. 5, 1924.

R. B. SMART 1,503,966

ADDRESSING MACHINE

Filed May 6, 1921     4 Sheets-Sheet 4

Witness
Edward T. Wray.

Inventor
Rupert B. Smart
by Parks & Carter
Attorneys

Patented Aug. 5, 1924.

1,503,966

UNITED STATES PATENT OFFICE.

RUPERT B. SMART, OF CHICAGO, ILLINOIS.

ADDRESSING MACHINE.

Application filed May 6, 1921. Serial No. 467,352.

*To all whom it may concern:*

Be it known that I, RUPERT B. SMART, a citizen of the United States, residing at Chicago, in the county of Cook and State of Illinois, have invented a certain new and useful Improvement in Addressing Machines, of which the following is a specification.

This invention relates to improvements in addressing machines, and has for one object to provide a machine which may be used in connection with a galley of addresses. Other objects will appear from time to time throughout the specification and claims.

The invention is illustrated more or less diagrammatically in the accompanying drawings, wherein—

Fig. 4 is a vertical section on line 4—4 of Figs. 1 and 2;

Like parts are designated by like characters throughout.

A is the top of an operating table upon which is mounted the bottom member A' of the addressing machine. Secured to the member A' are side pieces $A^2$ $A^2$, which are adapted to enclose and guide the parts of the machine. The member A' is slotted as at $A^3$ throughout substantially the length of the machine.

Within this slot is located the movable rack bar B having in it the pins B' which are fixed within and project laterally from one of its sides. Lying also within the slot $A^2$ is the pawl carrier C. It has pivotally mounted upon it the pawl C' which is held by means of the spring $C^2$, so that it is normally in contact with one of the pins B' of the rack bar B. This pawl carrier is reciprocated in the manner described below. During its forward reciprocation the pawl engages one of the pins of the rack bar and so carries it forward. During its rearward reciprocation the pawl rides over the pins and the rack bar is not moved.

Supported upon and adapted to move with the rack bar B, is the galley D within which are positioned rows or lines of type D' from which the addresses are printed.

Figure 3:
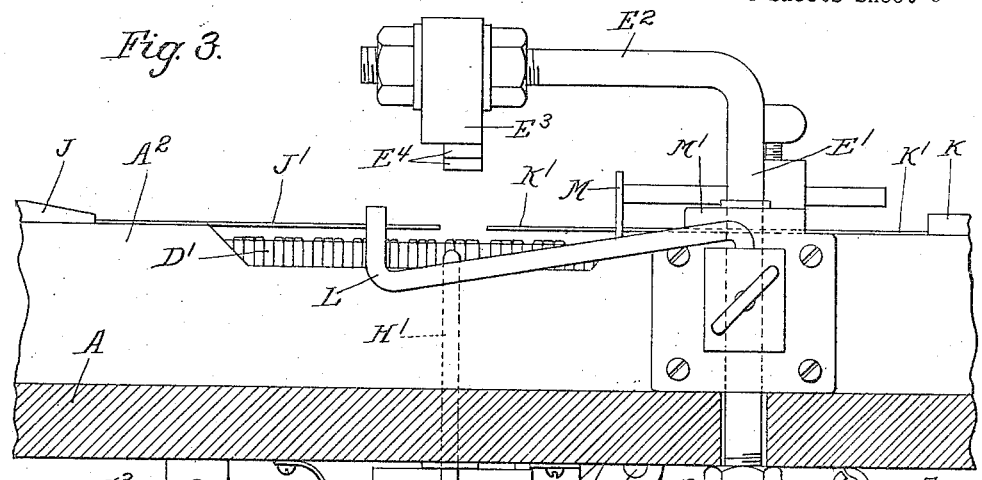
Fig. 3 is a side elevation with parts broken away.
Figure 7:
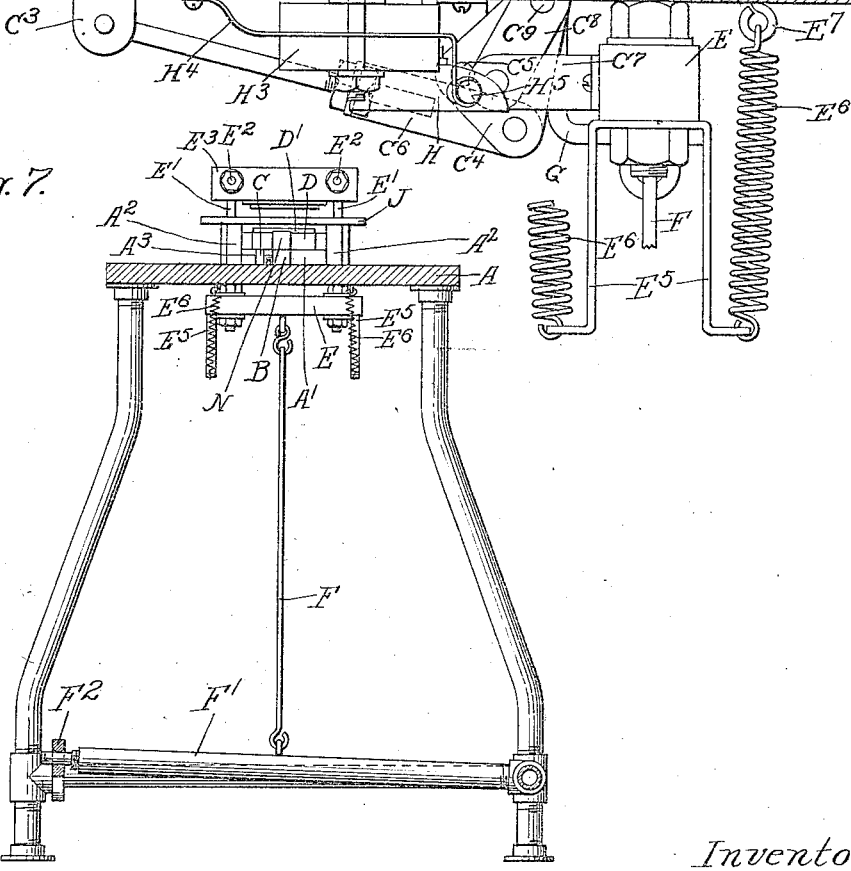
Fig. 7 is a vertical section on line 7—7 of Fig. 6.
Figure 5:
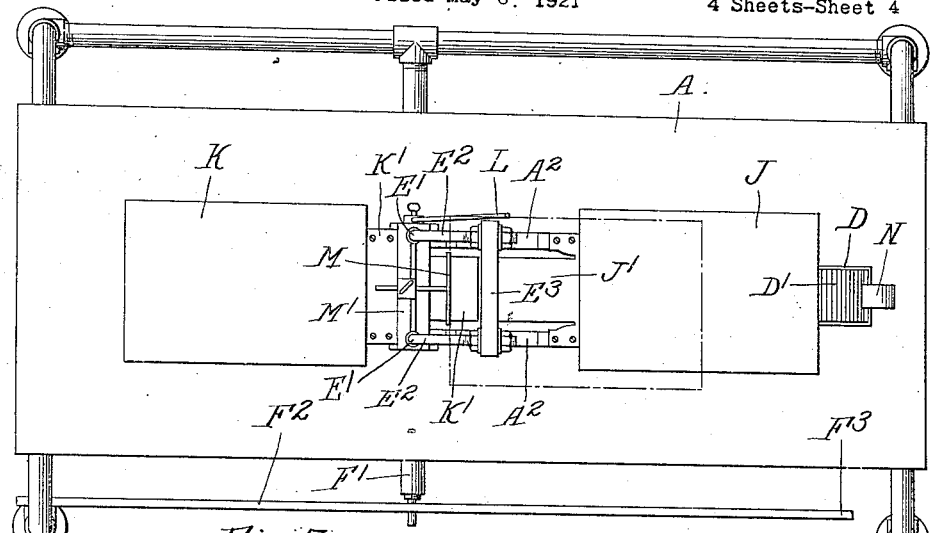
Fig. 5 is a plan view showing the table and mounting.
Figure 6:
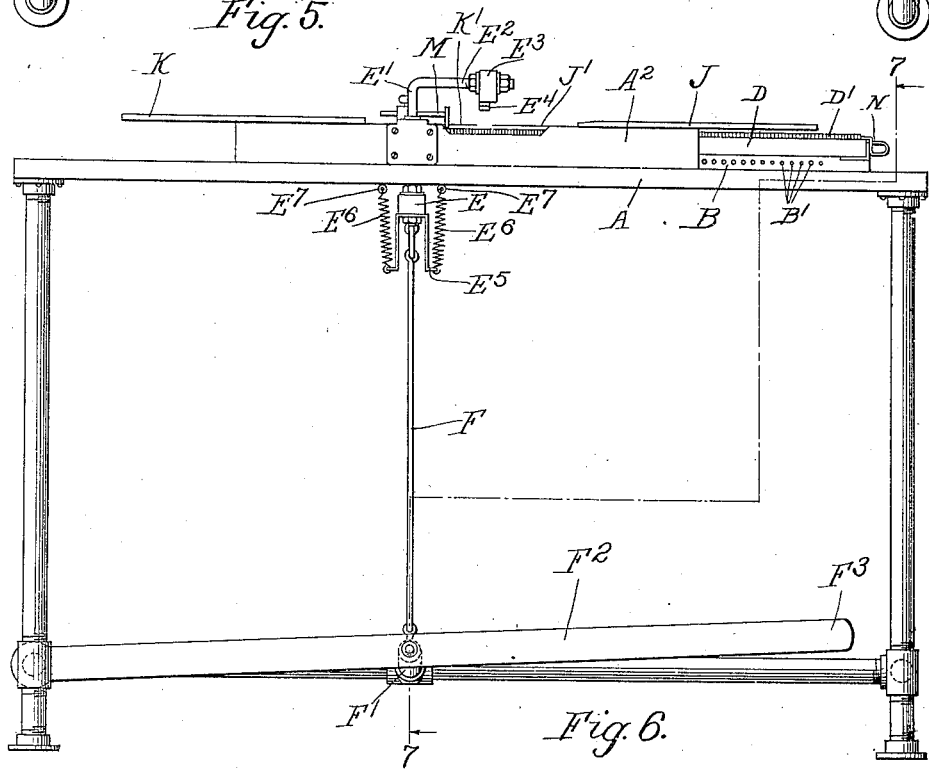
Fig. 6 is a side elevation of the same.

Mounted beneath the member A is the cross head E, in either end of which is fixed one of the upwardly extending rods E'. These rods are bent rearwardly as at $E^2$ and are joined by the additional cross head $E^3$ which carries in its under surface the platen $E^4$. Underneath and at either end of the cross head E is mounted the yoke $E^5$, to either arm of which is secured the coil spring $E^6$. The other ends of these coil springs are secured to the under side of the addressing machine table as at $E^7$. The tension of these springs normally holds the cross head E and its associated parts in the position shown in Fig. 3.

In order to operate the machine the cross head is reciprocated vertically by means of the following mechanism. Attached to the cross head E is the rod F which in turn communicates with the cross bar F'. At one end F' is mounted for rotation on the supporting means of the table and at the other end it is connected to the treadle member $F^2$, which at one end is pivoted to the supporting member of the table, and at the other end $F^3$ is free. When pressure is applied to the treadle, the cross head E is pulled downwardly in opposition to the tension of the springs $E^6$. When the pressure is released the cross head is raised by the springs. By means of the reciprocation of the cross head E and the parts mounted upon it, the rack bar is moved forward step by step by the following mechanism.

The pawl carrier C is mounted in the slot $A^3$ for lateral reciprocation. It has secured to it on its under side the projection $C^3$. Pivotally mounted beneath the table top A is the triangular crank plate $C^4$ which is pivoted at one corner to the table at $C^5$. At another corner is the pivotal connection $C^6$ which is also attached to the projection $C^3$. Attached to the cross head E is the member $C^7$ which has pivotally connected to it the link $C^8$, which is also pivotally connected to the crank plate at $C^9$. By means of this mechanism, when the cross head E is reciprocated vertically the crank plate is moved, and movement is through it imparted to the rack bar so as to move it laterally forward step by step.

Mounted on the cross head E is the vertical rod G which penetrates through the hole in the table A and into the path of the pins B' of the rack bar. This rod G, of course, moves vertically with the movement of the cross head E.

Beneath the table is mounted the bell H, near which and projecting through the table A is the rod H' having the laterally bent upward portion H². The rod H' has mounted on its lower end the laterally extending member H³, which is adapted to pull against the spring H⁴ which carries in its free end the bell knocker H⁵. The upper end H² of the rod H' extends partially into the path of the galley. At appropriate intervals on the galley, for example, between certain divisions are groups of the addresses set on fillers which are inserted. As the galley progresses forward these strike the end of the rod H² and move it so as to rotate the rod H' and compress the spring H⁴. When the galley has moved along a sufficient distance to free the member H² from the extending filler the spring rotates the rod H' back to its original position, and in so doing the bell knocker strikes the bell.

Figure 1:
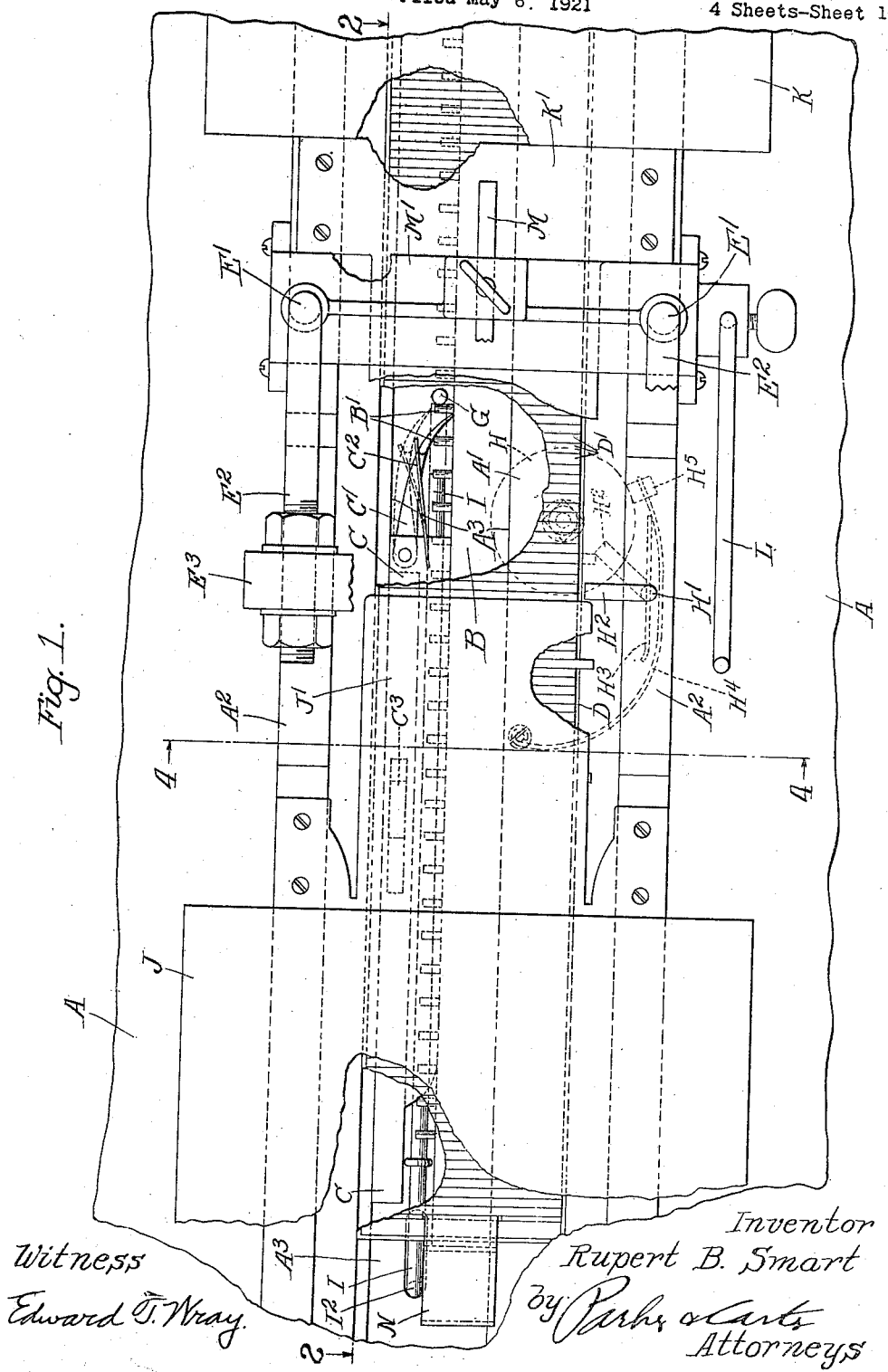
Figure 1 is a partial plan view with parts broken away.
Figure 2:
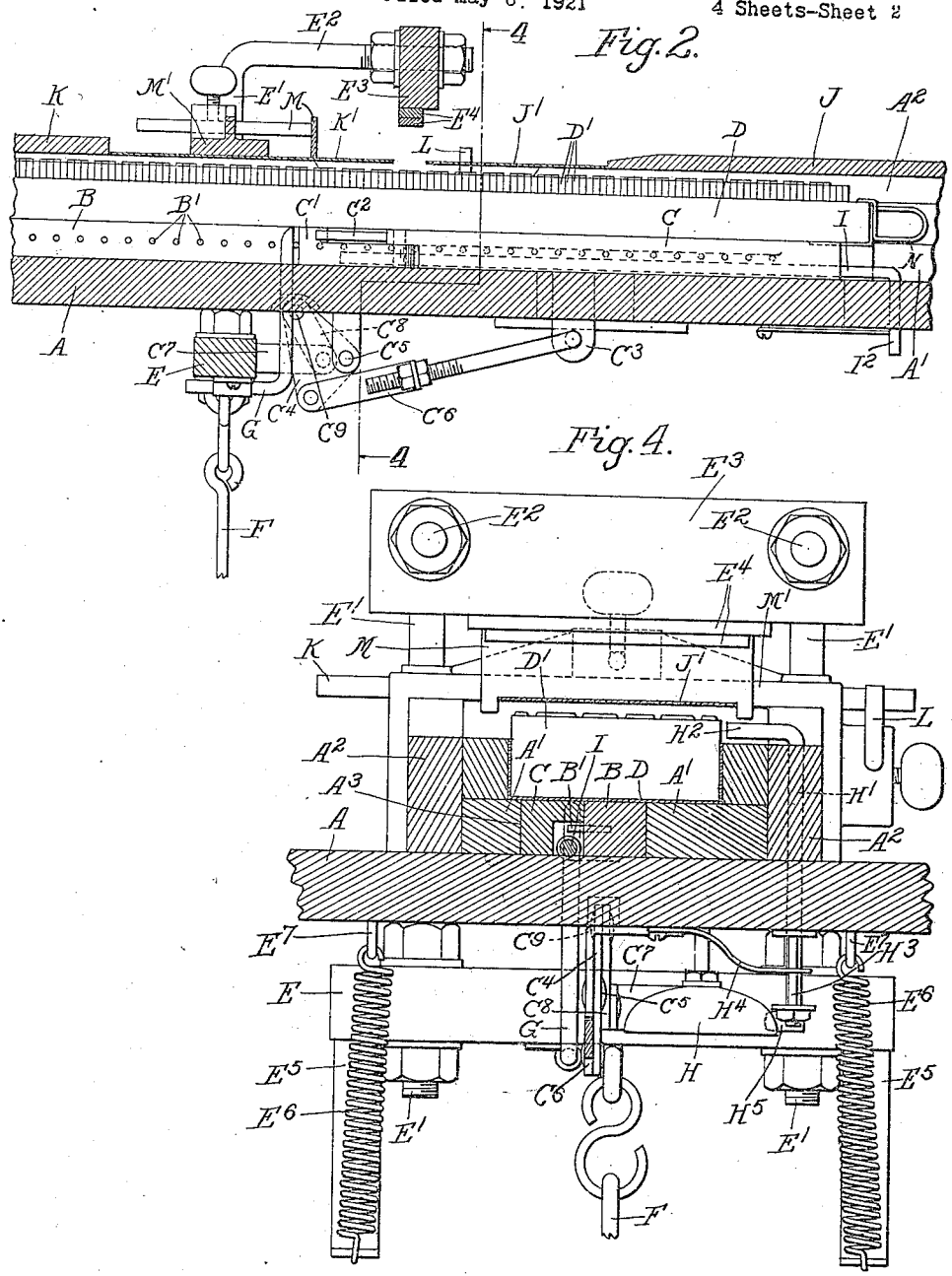
Fig. 2 is a vertical section drawn on line 2—2 of Fig. 1.

For purposes of manipulation a means is provided to hold the pawl out of operative position. For this purpose the rod I is movably mounted along the inside of the slot A³. The rod has the downwardly depending handle part I². When it is in the position shown in full lines in Fig. 1, it lies under the pins B' of the rack bar B and is entirely out of contact with the pawl. When it is desired to hold the pawl out of operation the cross head and its assembled members are depressed. This carries the pawl carrier and pawl rearwardly. The rod I is then moved forward manually, by means of the downwardly bent handle portion I² to the position shown in dotted lines in Fig. 1. If the cross head assembly be then allowed to rise under influence of the springs, the pawl will be held in the position shown in dotted lines in Fig. 1, since the rod I now extends into its path and beyond its end and thus prevents the spring C² from forcing the pawl into contact with the pins and will be unable to contact the pins.

Above the addressing machine is mounted the feed platform J, which has the forward extension J', which is yieldingly mounted or composed of springy metal in order that it may be downwardly depressed during the feeding operation.

The receiving platform K is mounted at the other end of the addressing machine, and has at its rearward end a flexible extension K' similar to the extension J' of the feed platform J.

Adjustably mounted at the side of the machine is the side guide rod L. It may be moved in or out and is used as a guide against which the edge of the wrapper or other article which is being printed may be stopped so as to establish the margin.

Another margin guide M is adjustably mounted on the bridge M' across the addressing machine. It is mounted so as to be moved in or out, and so as to furnish a vertical guide.

N is a clip which secures the galley to the rack bar. It serves also as a handle for manipulating the rack bar and galley when the two are attached together.

I have shown an operating invention, and especially an addressing machine, although shown here comprising the addressing mechanism together with the parts of the table to which it is adapted, it may be separated therefrom and the addressing machine alone may be treated as a unit without the table or treadle. Still it will be obvious that many changes both of form, shape, and relation of parts may be made without departing materially from the spirit of my invention, and I wish therefore, that my showing be taken as in a sense diagrammatical.

The use and operation of this invention are as follows:

The addressing machine as prepared for use is designed for use primarily in newspaper offices and the like wherein it is necessary to address long lists of newspaper wrappers and similar articles. For this purpose the addresses are ordinarily set up on linotype machines, and are then assembled in the galley. In the galley they may be assembled in any order, for example, alphabetically or geographically, or where the newspapers are delivered by carrier, they are commonly assembled by routes, so that the copies which are to be delivered on a given route or by a given messenger are addressed and kept together. Whatever the arrangement the addresses are assembled in the galley which is then mounted on the rack bar and inserted in the machine. In order to be inserted in the machine it is necessary for the cross head mechanism to be depressed. The rack bar galleys are then inserted in the slot of the machine at the point where the feed mechanism engages the pins in the rack bar. From this point on the bar is fed steadily forward step by step in response to the vertical reciprocation of the cross head and assembled parts. With this reciprocation the pawl carrier is moved rearwardly and the pawl rides over one pin. Upon the forward movement of the pawl carrier, the pawl engages the pin which it has just ridden over and moves the rack bar forward. During the time that the pawl carrier starts rearwardly, the check rod starts downwardly. When the pawl carrier starts forward the check rod starts upward and projects into the path of the rack bar at approximately the time that the forward movement of the rack bar has completed this stage in the cycle of operations. One pin of the rack bar is caught between the feed pawl and the check rod and the rack bar and galley are of course held against motion.

The sheet to be printed is moved under the platen. As the platen moves downward, the sheet is pressed against the row of type which is beneath the platen and the printing is thus made. As the platen moves upward the sheet is free to be moved away. The rack bar is moved forward bringing into place another address or line of printing. Thus with the reciprocation of the cross-head assembly the sheet is printed and the rack bar and galley are moved forward the place of one address.

Claims:

1. In an addressing machine the combination of a frame, a galley carrier slidable in said frame, a rack bar adapted to carry said carrier, means for progressively advancing said rack bar and carrier, said means comprising a reciprocating block, a pawl on said block adapted in the forward movement of said reciprocating member to engage a pin on said rack bar, and in its rearward movement to pass over the pins of said rack bar, and a locking member adapted to lock said pawl out of contact with said pins.

2. In an addressing machine the combination of a galley engaging bar and a type holding galley, and means for progressively moving said bar and galley forward said means including a head adapted to reciprocate toward and away from said galley and a work supporting plate above said galley formed so as to be generally rigid and provided with a flexible part and adapted to carry the material upon which the addresses are to be printed, said work support overlying the galley and cut-away beneath said head.

3. In an addressing machine the combination of a rack bar and a type holding galley, and means for progressively moving said rack bar and galley forward, a vertically reciprocating head above said frame and a flexible work supporting plate adapted to carry the material upon which the addresses are to be printed, said work supporting plate overlying said galley, and cut away beneath said printing head, and adjustable work positioning means adapted to position the material upon which printing is to take place with relation to said printing head.

4. In an addressing machine the combination of a frame, a galley carrier slidable in said frame, a rack bar provided with projections and adapted to carry said carrier, means for progressively advancing said rack bar and carrier, said means comprising a reciprocating block, a pawl on said block adapted in the forward movement of said reciprocating member to engage one of said projections on said rack bar, and in its rearward movement to pass over the pins of said rack bar, and a manually controlled locking member adapted to lock said pawl out of contact with said pins.

5. In an addressing machine the combination of a frame, a galley carrier slidable in said frame, a rack bar provided with projections and adapted to carry said carrier, means for progressively advancing said rack bar and carrier, said means comprising a reciprocating block, a pawl on said block adapted in the forward movement of said reciprocating member to engage one of said projections on said rack, and in its rearward movement to pass over the pins of said rack bar, and a locking member adapted to lock said pawl out of contact with said pins to hold said pawl back against the resistance of its actuating spring.

6. In an addressing machine the combination of a rack bar and a type holding galley, and means for progressively moving said rack bar and galley, a vertically reciprocating head above said frame and a rigid work supporting plate provided with a flexible portion and adapted to carry the material upon which the addresses are to be printed, said work supporting plate overlying said galley, and cut away beneath said printing head, and adjustable work positioning means adapted to position the material upon which printing is to take place with relation to said printing head.

7. In an addressing machine the combination of a frame and a type holding assembly, said assembly adapted to be mounted upon a forward feeding device, said device including a reciprocating block, means for reciprocating the same including a cam plate pivotally mounted on the frame and having attached to it at a point separated from its pivot a rod connected to said reciprocating block, means for rotating said cam plate in response to the printing operation whereby said block is caused to reciprocate and to feed said type assembly in synchronized motion with the motion of the printing operation.

8. In an addressing machine a type holding assembly and a feed carrier adapted to be reciprocated back and forth to feed forward said type assembly to the printing point, means for reciprocating said carrier and means for printing from the type, said type printing means including a vertically reciprocating printing head, said carrier reciprocating means including a cam plate pivotally supported on the frame and having connected to it at a point separated from its pivot, an arm connected to said type carrier, and having connected to it at another point an arm connected to a portion of said printing head, said printing head adapted by its vertical reciprocation to rotate said cam plate and to move said feed carrier so as to move said type.

9. In an addressing machine a type holding assembly and a feed carrier adapted to be reciprocated back and forth to feed forward said type assembly to the printing point, means for reciprocating said carrier and means for printing from the type, said type printing means including a vertically reciprocating printing head, said carrier reciprocating means including a cam plate pivotally supported on the frame and having connected to it at a point separated from its pivot, an arm connected to said type carrier, and having connected to it at another point an arm connected to a portion of said printing head, said printing head adapted by its vertical reciprocation to rotate said cam plate and to move said feed carrier so as to move said type, the movement of the type being thus synchronized with the movement of the printing head so as to bring a separate address under the printing head with each reciprocation of said head.

Signed at Chicago, county of Cook, and State of Illinois, this 3rd day of May, 1921.

RUPERT B. SMART.